US012754940B2

(12) United States Patent
Kyakuno

(10) Patent No.: US 12,754,940 B2
(45) Date of Patent: Oct. 6, 2026

(54) INFORMATION PROCESSING DEVICE, AND INFORMATION PROCESSING METHOD

(71) Applicant: AXELL CORPORATION, Tokyo (JP)

(72) Inventor: Kazuki Kyakuno, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 129 days.

(21) Appl. No.: 18/829,864

(22) Filed: Sep. 10, 2024

(65) Prior Publication Data

US 2025/0103627 A1 Mar. 27, 2025

(30) Foreign Application Priority Data

Sep. 22, 2023 (JP) ................................ 2023-158135

(51) Int. Cl.
*G06F 17/27* (2006.01)
*G06F 16/3329* (2025.01)
*G06F 16/334* (2025.01)

(52) U.S. Cl.
CPC ...... *G06F 16/3329* (2019.01); *G06F 16/3347* (2019.01)

(58) Field of Classification Search
CPC ............ G06F 16/3329; G06F 16/3347; G06F 16/3344; G06F 16/93; G10L 15/04
USPC .............................................................. 704/9
See application file for complete search history.

(56) References Cited

U.S. PATENT DOCUMENTS 11,574,639 B2 * 2/2023 Kanda ...................... G10L 15/04
2023/0224360 A1 7/2023 Kawashima et al.
2024/0403341 A1 * 12/2024 Berglund ............ G06F 16/3344

FOREIGN PATENT DOCUMENTS

CN 109960684 A * 7/2019 ........... G06V 30/416
JP 2005094328 A * 4/2005
WO 2021/255803 12/2021

OTHER PUBLICATIONS

"How LlamaIndex v0.7 works and how to customize it", 8 pages [online] Jul. 12, 2023 <URL: https://note.com/npaka/n/n27a36f784fb3 >.

* cited by examiner

*Primary Examiner* — Md S Elahee
(74) *Attorney, Agent, or Firm* — Wenderoth, Lind & Ponack, L.L.P.

(57) ABSTRACT

There is provided an information processing device for obtaining an answer to a query by processing a document and the query using a machine learning model provided by a server device. The information processing device includes: a reception portion configured to receive the query input by a user using an input device; a search portion configured to search for one or more documents stored in a document database private to the server device based on the received query and configured to acquire one or more contents having high relevance to the query as a search result; a transmission portion configured to transmit the search result to the server device via a communication device; and a receiving portion configured to receive, from the server device via the communication device, an answer sentence generated by the server device using the transmitted search result.

12 Claims, 11 Drawing Sheets

31
DOCUMENT DB
CHUNK (1024 TOKENS)
FOLDER A
DOCUMENT ID1
1-1 1-2 1-3 1-4
DOCUMENT ID2
2-1 2-2 2-3 2-4
FOLDER B
DOCUMENT ID3
3-1 3-2 3-3 3-4
DOCUMENT ID4
4-1 4-2 4-3 4-4
Embedding
RELATED FEATURE VECTORS (1-3, 2-2, 3-1)
32
VECTOR DB
FEATURE VECTOR OF EACH CHUNK
DOCUMENT ID1
1-1 1-2 1-3 1-4
DOCUMENT ID2
2-1 2-2 2-3 2-4
DOCUMENT ID3
3-1 3-2 3-3 3-4
DOCUMENT ID4
4-1 4-2 4-3 4-4
FEATURE VECTOR OF QUERY
1-1
2-2
3-1
LLM

INFORMATION PROCESSING DEVICE, AND INFORMATION PROCESSING METHOD

CROSS-REFERENCE TO RELATED APPLICATIONS

This application is based on and claims priority under 35 USC § 119 from Japanese Patent Application No. 2023-158135 filed on Sep. 22, 2023, the contents of which are incorporated herein by reference.

TECHNICAL FIELD

The embodiments discussed herein are related to an information processing device, an information processing method, and a non-transitory computer-readable storage medium.

BACKGROUND

Semantic search of documents using a large-language model (LLM) such as ChatGPT is known. For example, Chatbot that uses a LLM to answer questions about products is being developed.

A user device such as a smartphone that executes an application incorporating Chatbot and a server device that provides a LLM form an answer system.

However, a LLM cannot generate an answer using not learned data, and thus there is a problem that, for example, Chatbot cannot answer questions about product specifications about which Chatbot is not knowledgeable.

Regarding such a problem, documents of product specifications desired to be answered are provided as contexts to the LLM. In response to a question (query) such as "my air conditioner is making a strange noise, what should I do?", a server searches a database based on the query, generates text such as "this air conditioner is of model A and has specifications B. In case of C, please do D", then concatenates and queries the text to the LLM. In this manner, the LLM can answer unlearned knowledge by being complemented.

In this manner, LlamaIndex (https://www.llamaindex.ai) is known as an open source answer system implemented by complementing a LLM.

In LlamaIndex, a context having high relevance to a query is generated from a PDF file or the like that is a knowledge source, and a prompt including the query and the context is transmitted to a LLM (ChatGPT), so that a question and an answer to unique data can be made.

Although not a LLM, a configuration for complementing processing by a server device that provides a function of a machine learning model with a cloud service is known in the related art (Patent Literature 1).

Patent Literature 1: WO2021/255803A1

Non Patent Literature 1: How LlamaIndex v0.7 works and how to customize it [online], Jul. 12, 2023, [searched Sep. 15, 2023], Internet <URL: https://note.com/npaka/n/n27a36f784fb3>

According to a mechanism disclosed in Non Patent Literature 1, an answer system using unique data not learned by a LLM is possible. However, data needs to be transmitted to a cloud (external server) to be provided to the LLM. Accordingly, there are security concerns when the data to be transmitted belongs to confidential information or data that should be kept secret.

An aspect of the present invention is to solve security concerns in an answer system.

SUMMARY

There is provided an information processing device for obtaining an answer to a query by processing a document and the query using a machine learning model provided by a server device. The information processing device includes: a reception portion configured to receive the query input by a user using an input device; a search portion configured to search for one or more documents stored in a document database private to the server device based on the received query and configured to acquire one or more contents having high relevance to the query as a search result; a transmission portion configured to transmit the search result to the server device via a communication device; and a receiving portion configured to receive, from the server device via the communication device, an answer sentence generated by the server device using the transmitted search result.

DESCRIPTION OF EMBODIMENTS

Hereinafter, an embodiment of the present invention will be described in detail with reference to the drawings.

Figure 1:
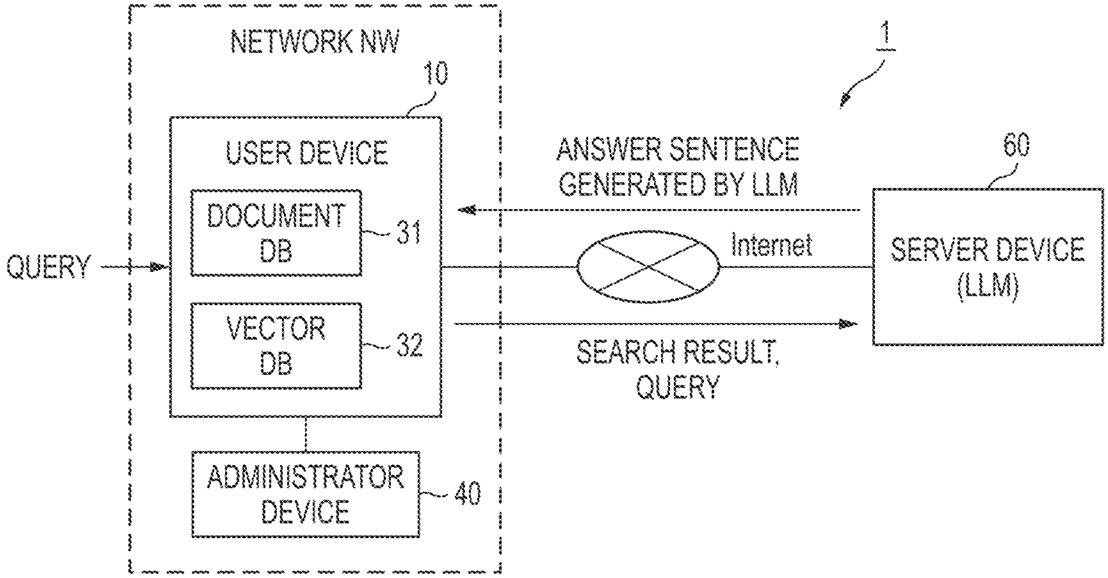
FIG. 1 is a schematic diagram of an answer system.

FIG. 1 is a schematic diagram of an answer system according to the present embodiment.

An answer system 1 includes a user device (information processing device) 10 used by a user and a server device 60 that provides a cloud service.

The user device 10 is connected to a local network NW such as an in-house network. An administrator device 40 used by a network administrator or a department administrator is connected to the in-house network. Here, the local network NW is referred to as the in-house network NW.

The user device 10 is connected to the Internet via the in-house network NW. The server device 60 is accessible on the Internet.

The user device 10 and the server device 60 can communicate with each other via the in-house network NW and the Internet.

The user device 10 and the administrator device 40 are personal computers (PCs), smartphones, and the like.

The user device 10 includes a document database (DB) 31 and a vector database (DB) 32. As described later, the document DB 31 stores one or more documents as a knowledge source, and the vector DB 32 vectorizes and stores the document in the document DB 31.

The document DB 31 and the vector DB 32 may be stored in, for example, a file server or a database server connected to the in-house network NW.

Embedding described later is a feature vector obtained by converting text, and it is difficult to restore the original text from the vector. Accordingly, there are few security concerns, and thus the vector data DB 32 may be provided in the server device 60 or another external storage.

In the present embodiment, the user device 10 includes the vector DB 32 in an internal storage thereof.

The server device 60 provides a large-scale language model (LLM) as a cloud service.

In response to a question received by the user device 10 from a user, the server device 60 generates an answer in a natural language using the LLM and transmits the answer to the user device 10. The answer generated by the server device 60 is provided to the user of the user device 10.

The user device 10 may be a dedicated terminal device for inputting a question to the answer system 1 and displaying an answer sentence. The user device 10 may further execute a freely selected application, receive a question or the like about a usage method of the application from the user, and display an answer.

The LLM basically cannot generate an answer using unlearned data. However, the LLM can also provide an answer about unlearned matter by being provided with, as a context, a document that is a source of an answer sentence.

For example, even when the LLM did not learn about specifications of a certain product, the LLM can provide an answer to a question by being provided with a document of the product specifications.

As described later, the answer system 1 according to the present embodiment can provide an answer to a user even when a content for which an answer is sought is related to a confidential document and the confidential document cannot be learned by the LLM that is an external service.

Upon receiving a question (query) from the user, the user device 10 executes embedding (described later) for the query and calculates a feature vector of the query.

The user device 10 then compares the feature vector of the query with feature vectors of documents stored in the vector DB 32, and acquires an ID of a document having high relevance (high similarity) to the calculated query.

The user device 10 acquires a part (chunk described later) of the document corresponding to the acquired ID from the document DB 31. The user device 10 then transmits a prompt including the acquired document and the query to the server device 60.

The server device 60 generates an answer sentence based on the transmitted prompt, and transmits the answer sentence to the user device 10.

The user device 10 displays the transmitted answer sentence on a display device of the user device 10, and provides an answer to the user. The user device 10 may output the answer sentence by reading from a speaker of the user device 10.

Figure 2:
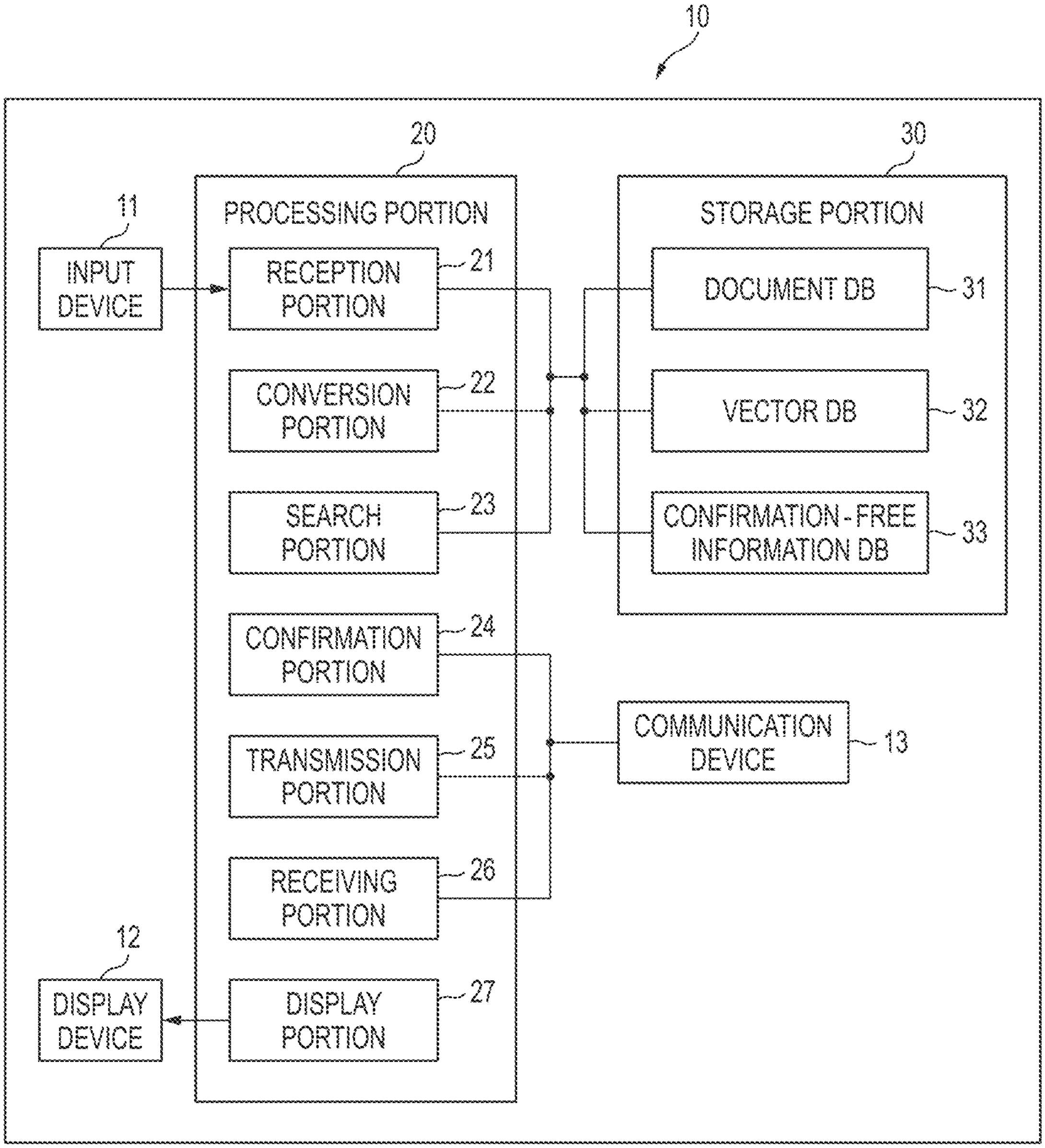
FIG. 2 illustrates a schematic configuration of a user device.

FIG. 2 illustrates a schematic configuration of a user device according to the present embodiment.

The user device 10 includes an input device 11, a display device 12, a communication device 13, a processing portion 20, and a storage portion 30.

The input device 11 is a keyboard or a touch panel, and is used for the user to input a question sentence to the user device 10.

The display device 12 is a liquid crystal display device or an organic EL display device, and displays a display screen 100 described later that includes an input field for a question sentence, a search result, a confirmation dialog, an answer field for displaying an answer sentence received by the user device 10 from the server device 60, and the like.

The communication device 13 connects the user device 10 to a network.

The processing portion 20 executes processing in the user device 10.

The storage portion 30 stores various types of information and data for the processing portion 20 to perform processing. For example, the storage portion 30 stores the document DB 31 and the vector DB 32. The storage portion 30 can further store a confirmation-free information database (DB) 33 that registers chunks, documents, and folders for which confirmation of transmission approval is not necessary.

The processing portion 20 includes a reception portion 21, a conversion portion 22, a search portion 23, a confirmation portion 24, a transmission portion 25, a receiving portion 26, and a display portion 27.

The reception portion 21 receives a query (question sentence) input by the user using the input device 11.

The conversion portion 22 executes embedding for the query received by the reception portion 21 and converts (vectorizes) the query into a feature vector. The conversion portion 22 further executes embedding for documents stored in the document DB 31 and converts the documents into feature vectors, and stores the converted feature vectors in the vector DB 32.

The search portion 23 searches for a document (chunk) having high relevance to the query in the vector DB 32 using the query vectorized by the conversion portion 22.

The confirmation portion 24 confirms whether the document (chunk) that is a search result of the search portion 23 can be transmitted to the server device 60. The confirmation portion 24 may also transmit the search result to the administrator device 40 via the communication device 13 and receive a search result determined as transmittable by the administrator device 40 from the administrator device 40.

The transmission portion 25 transmits the search result determined as transmittable and the query to the server device 60 via the communication device 13.

The receiving portion 26 receives an answer sentence, which is generated by the server device 60 using the transmitted search result, from the server device 60 via the communication device 13.

The display portion 27 displays the display screen 100 on the display device 12.

Figure 3:
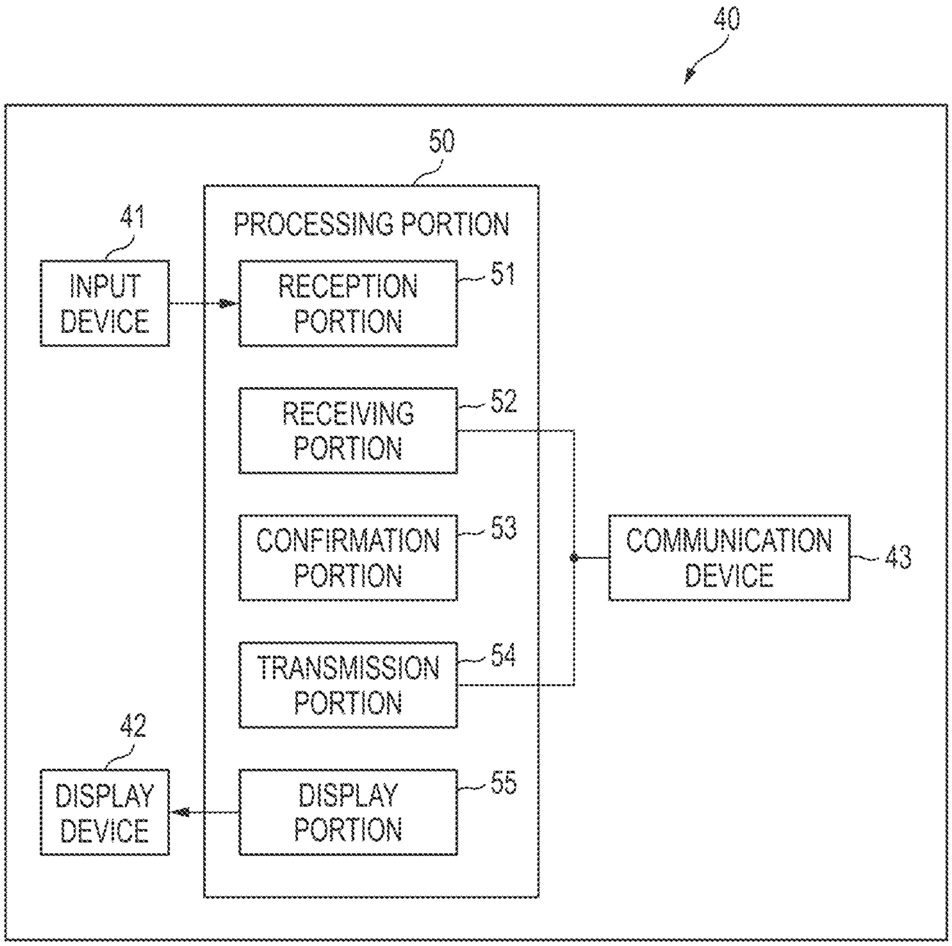
FIG. 3 illustrates a schematic configuration of an administrator device.

FIG. 3 illustrates a schematic configuration of an administrator device according to the present embodiment.

The administrator device 40 includes an input device 41, a display device 42, a communication device 43, a processing portion 50, and a storage portion 30.

The input device 41 is a keyboard or a touch panel, and is used for a user to input a question sentence to the administrator device 40.

The display device 42 is a liquid crystal display device or an organic EL display device, and displays the display screen 100 including a search result received from the user device 10 and a confirmation dialog.

The communication device 43 connects the administrator device 40 to a network.

The processing portion 50 executes processing in the administrator device 40.

The processing portion 50 includes a reception portion 51, a receiving portion 52, a confirmation portion 53, a transmission portion 54, and a display portion 55.

The reception portion 51 receives an input operation to the administrator device 40 performed by an administrator using the input device 41.

The receiving portion 52 receives a document (chunk) that is a search result from the user device 10 via the communication device 13.

The confirmation portion 53 confirms whether the document (chunk) that is a search result received from the user device 10 can be transmitted to a cloud (server device 60).

The transmission portion 54 transmits a search result determined as transmittable and a query to the user device 10 via the communication device 13.

The display portion 55 displays the display screen 100 on the display device 42.

The present embodiment will be described in detail.

The user device 10 transmits a document to complement the LLM about an unlearned content. As an example, a part of the document instead of the entire document that is a source of an answer sentence is transmitted to the server device 60. One reason for transmitting a part of the document to the server device 60 is that there is an upper limit such as 8092 in the number of tokens that can be handled at one time by the LLM and all text included in the document cannot be provided to the LLM.

Tokens are, for example, words segmented from text by morphological analysis. For example, text "today is a good day" is segmented into tokens "today", "is", "a", "good", and "day". In many natural language processing models including the LLM, text is segmented into units called tokens and then input to a machine learning model.

Another reason for transmitting a part of the document to the server device 60 is a matter of information leakage by providing the entire document. Inputting the entire document into the LLM may enable the LLM to provide a more detailed answer, but the LLM may learn the entire document, including parts that are not directly used to answer a query. Even when learning is not performed, there is a certain risk in a network path to the server device 60 and transmitting data to an external server itself.

Accordingly, in the answer system 1 according to the present embodiment, a document is segmented into chunks made up of 1024 tokens, for example, and a chunk closest to a query content is queried to the LLM.

When there are chunks close to the query content across a plurality of documents, chunks closest to the content in each document may be collected and queried to the LLM.

In this manner, a problem of the number of tokens that can be input to the LLM can be avoided, and leakage of confidential information to outside of a company can be prevented.

For example, when searching in-house data having a data size of 100 GB, only a chunk of about 8 KB closest to a query is transmitted to the LLM. This remarkably reduces a risk of information leakage and is relatively secure.

Even transmitting one entire document to the server device 60 is fairly secure compared with a case in which the entire document DB 31 is stored in the server device 60, and the LLM can generate an answer using the entire document. Accordingly, although the problem of the number of tokens that can be input to the LLM remains, the entire one document may be transmitted to the server device 60 in consideration of risks and merits.

In the present embodiment, for example, embedding is used to search for a chunk or a document closest to a query. Embedding itself is a known method, and expresses meanings of sentences and words with real vectors to be handled by a computer.

Embedding that expresses the meanings of sentences with real vectors may be referred to as "sentence embedding" particularly. The sentence embedding is for calculating semantic similarity between sentences. By calculating similarity between vectors obtained by sentence embedding, semantic similarity between sentences can be measured, and document search in consideration of meanings of sentences can be performed based on the similarity. Sentence embedding and similarity calculation themselves are known techniques, and detailed descriptions thereof are omitted.

For example, by calculating cosine similarity from an inner product of a feature vector of a query and a feature vector of a document (chunk), semantic similarity between sentences can be measured as a numerical value.

"Sentence embedding" is executed by applying a document to a known AI model on a chunk or an entire document basis and converting the document into vector data (feature vector) indicating a meaning of the document.

Figure 4:
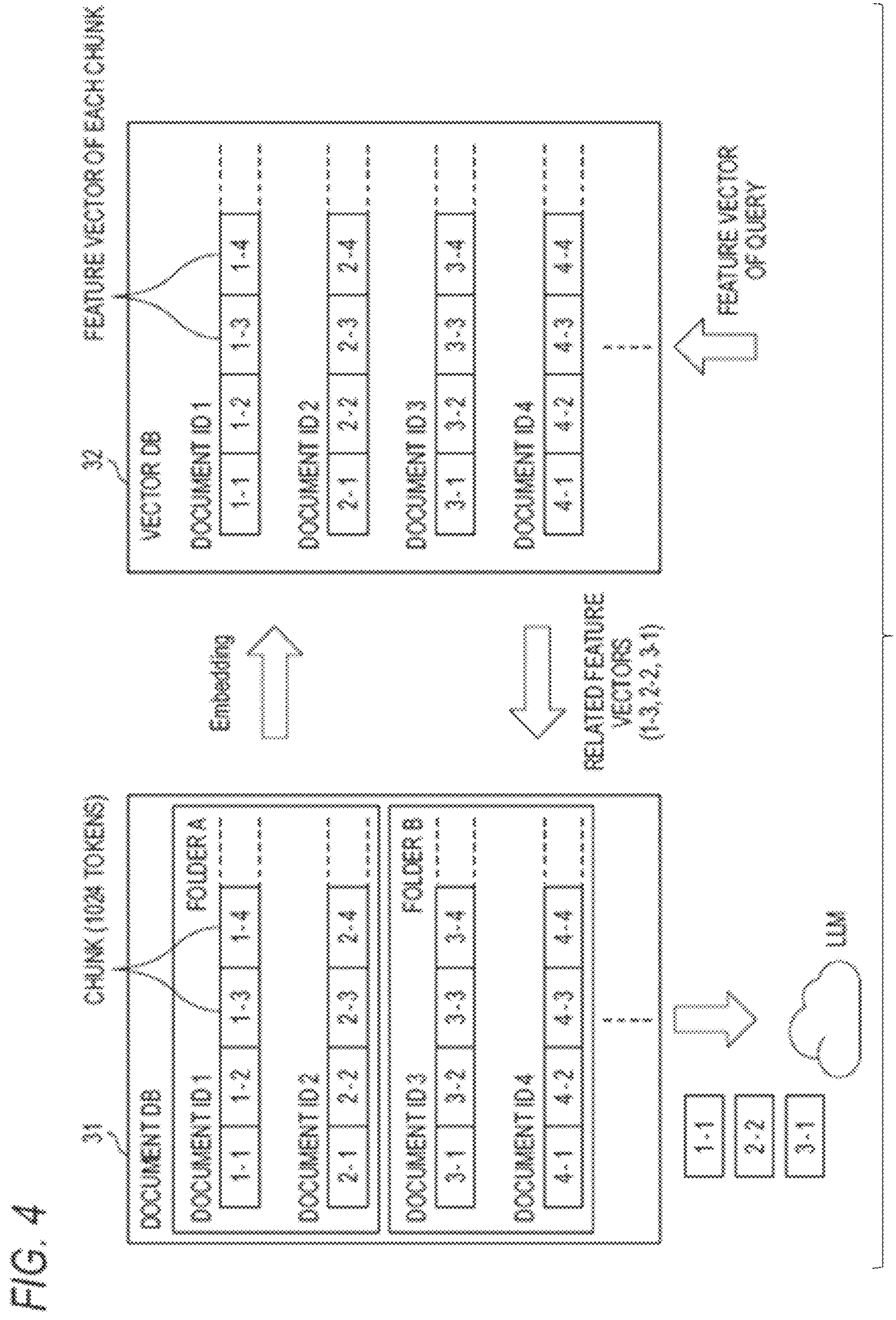
FIG. 4 illustrates data managed by a user device.

FIG. 4 illustrates data held by a user device.

As described above, the user device 10 executes embedding for each chunk of all confidential documents stored in the document DB 31, and calculates a feature vector. The user device 10 includes the vector DB 32, and stores the calculated feature vector in the vector DB 32.

The user device 10 stores the confidential documents in the document DB 31. When it is assumed that a query is performed from the in-house network NW to the LLM of the external server device 60 using the user device 10, the confidential documents are, for example, in-house documents.

The document DB 31 is not necessarily provided in the user device 10 itself, and may be stored in, for example, a file server or a database server connected to the in-house network NW, or an external storage that is private to the server device 60. Here, it is assumed that the user device 10 includes the document DB 31 in the internal storage.

As illustrated in FIG. 4, documents to which IDs are assigned are stored in the document DB 31. The documents themselves may be PDF documents or Word documents, and text extracted from the documents is stored in the document DB 31.

Since there is an upper limit such as 8092 for the number of tokens that the LLM can handle at one time, the document DB 31 segments and stores the documents in, for example, chunks including 1024 tokens as described above.

IDs (1, 2, 3, 4, 5 . . . ) are assigned to respective documents in the document DB 31, and IDs are also assigned to chunks segmented from the documents (1-1, 1-2, 1-3 . . . , 2-1, 2-2, 2-3 . . . , 4-1, 4-2, 4-3 . . . ).

The same applies to vectors converted from the chunks. In the vector ID 32, IDs corresponding to the original chunks and the IDs of the documents including the chunks are assigned.

Further, the documents in the document DB 31 can be divided into folders, and, for example, confidential documents and documents with low confidentiality can be managed separately.

Although there is the security problem described above, the problem of the upper limit of the number of tokens can be avoided by querying the LLM with only a chunk closest to a question.

If specifications of the LLM are not considered, a plurality of chunks determined as transmittable may be transmitted.

For example, as illustrated in FIG. 4, the user device 10 compares a feature vector of a query with vectors stored in the vector DB 32, searches for a vector having high relevance, for example, vectors having IDs of 1-3, 2-2, and 3-1, and searches the document DB 31 for chunks having IDs corresponding thereto.

The chunks of IDs 1-3, 2-2, and 3-1 are transmitted to the server device 60 together with the query and used for generating an answer.

When an entire document is transmitted to the server device 60, embedding is executed for each document in the document DB 31 to generate a feature vector, which is then compared with the feature vector of the query. As a result, an entire document having highest similarity to the query is transmitted to the server device 60 as a search result and used for generating an answer.

Even when only a part of a document is transmitted to the server device 60 as in the present embodiment, the part of the document to be transmitted may include confidential data (such as company internal data in a case of company). When an entire document is transmitted, a risk of including confidential data is higher.

Accordingly, the user device 10 prevents the confidential data from being transmitted to the server device 60 by a confirmation process or prohibition processing.

A configuration according to the present embodiment that prevents the confidential data from being transmitted to the server device 60 will be described below.

For example, a content of a chunk having high relevance to a searched query, a file name of a document including the chunk, and a confirmation dialog may be displayed on a display screen of the user device 10. Then, only when a user of a user device approves transmission, the chunk may be transmitted to the LLM in the server device 60.

Instead of asking the user of the user device 10 for confirmation of transmission approval, an administrator of a system or an organization to which the user belongs may be asked to confirm transmission approval. In this case, the user device 10 transfers the content of the searched chunk and the file name of the document including the chunk to the administrator device 40 on the in-house network.

When transmission is approved on a confirmation dialog displayed by the administrator device 40, the administrator device 40 transmits information indicating transmission approval to the user device 10.

When transmission is disapproved on the confirmation dialog displayed by the administrator device 40, the administrator device 40 transmits information indicating transmission disapproval to the user device 10.

The user device 10 may transmit the chunk that is a search result to the server device 60 only when receiving the information on transmission approval from the administrator device 40.

In this manner, the confidential data can be prevented from being freely transmitted to outside (outside the company) without confirming, and a secure answer system can be obtained.

Further, the chunk may be transmitted to the LLM in the server device 60 when confirmed by both the user and the administrator. In this case, the content of the searched chunk and the file name of the document including the chunk are transferred to the administrator device 40 even when transmission is approved by the user device 10. As a result, when the administrator device 40 disapproves the transmission, the user device 10 does not transmit the chunk to the server device 60, and when the administrator device 40 approves the transmission, the user device 10 transmits the chunk to the server device 60. In this manner, even when the user of the user device 10 attempts to transmit the confidential data to outside with own determination, the confidential data can be prevented from leakage by determination of the administrator.

However, confirming transmission approval each time a query is performed is cumbersome for both the user and the administrator who manages the user. Accordingly, transmission approval may not be confirmed for a transmission approved chunk and a related chunk.

That is, in the document DB 31, a chunk that was previously approved to be transmitted to the server device 60 by the user or the user and the administrator may not require confirmation of the user or the administrator thereafter. For this reason, the user device 10 can store a corresponding ID of the chunk in the confirmation-free information DB 33 of the storage portion 30.

In addition, in the document DB 31, a chunk included in the same document (file) as the chunk previously approved to be transmitted to the server device 60 may not require confirmation before transmission even when transmission is not approved directly. For this reason, the user device 10 can store a corresponding ID of the document in the confirmation-free information DB 33 of the storage portion 30.

Further, in the document DB 31, a chunk of a document stored in the same folder as a document including a chunk previously approved to be transmitted to the server device 60 may not require confirmation before transmission even when transmission is not approved directly. For this reason, the user device 10 can store a corresponding folder name in the confirmation-free information DB 33 of the storage portion 30.

A document stored in a specific folder in the document DB 31 may not require confirmation before transmission. Although it is considered not preferable from a viewpoint of security, to omit confirmation by the user or the administrator, it is possible to omit cumbersome confirmation and improve usability of the answer system by ensuring that confidential data is stored in a specific folder.

When a chunk having high relevance is included in a document belonging to company internal data as a result of search, the user device 10 may not transmit the chunk to the server device 60. When embedding is executed for a document stored in the document DB 31 and it is found that a prohibited word such as "company internal" and "confidential" is described in a specific position such as a header, the user device 10 can register the document as a non-transmittable document in the document DB 31 or the vector DB 32.

That is, for a document in which a prohibited word is confirmed, the user device 10 can register an ID of the document in the confirmation-free information DB 33.

For a document stored in the confirmation-free information DB 33, the user device 10 can prevent the document from being freely transmitted to the server device 60 without confirmation of the user or the administrator. In a first place, a document including a prohibited word can be excluded from search using a feature vector of a query without embedding.

In this manner, confidential data can be prevented from being transmitted to the server device 60 regardless of determination by the user or the administrator.

Further, even a document whose file attribute is confirmed and to which no specific permission such as accessible by the entire company is assigned may be stored in the confirmation-free information DB 33.

Chunks included in documents that are not stored in the confirmation-free information DB 33 may be transmitted to the server device 60 unconditionally, or may be confirmed by the user or the administrator of the user device 10.

Figure 5:
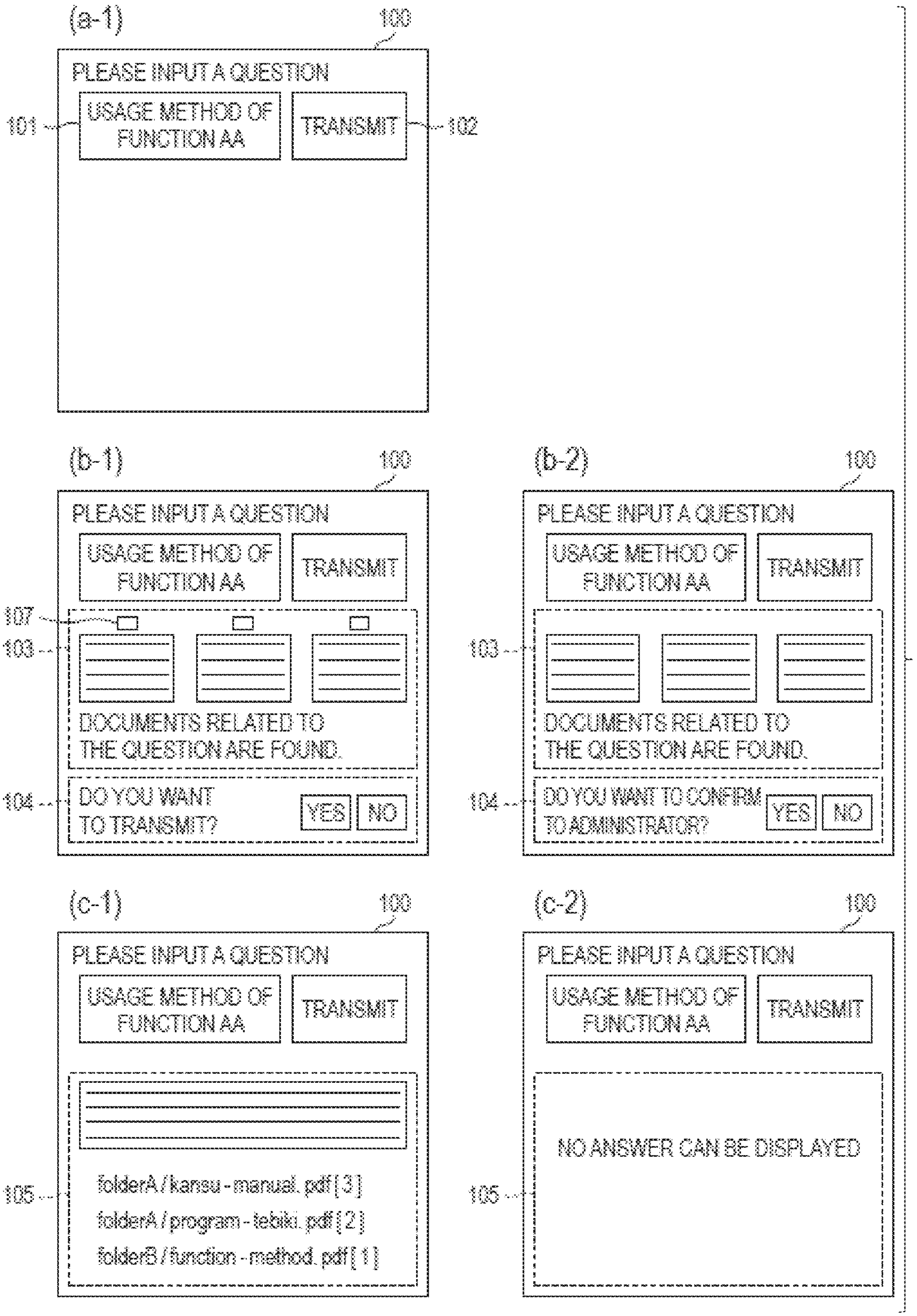
FIG. 5 illustrates in (a-1) to (c-2) procedures of a query and an answer in a user device.

(a-1) to (c-2) of FIG. 5 illustrate procedures of a query and an answer in a user device.

(a-1) of FIG. 5 illustrates the display screen 100 displayed on the display device 12 of the user device 10 when the user inputs a question (query).

The display screen 100 of (a-1) of FIG. 5 displays a question input field 101 and a transmit button 102.

The user inputs a question in a natural language into the question input field 101 using the input device 11, and selects the transmit button 102. With this operation, the user device 10 compares a feature vector of a question sentence input in the question input field 101 with feature vectors stored in the vector DB 32 as described above, and searches for a chunk (search result) corresponding to a vector having high relevance. When an entire document is transmitted, a search result is a document.

(b-1) of FIG. 5 illustrates the display screen 100 displaying a transmission confirmation screen.

In (b-1) of FIG. 5, the user device 10 displays a confirmation field 103 and a confirmation dialog 104 on the display screen 100.

The confirmation field 103 displays a search result content for confirmation by the user.

The confirmation dialog 104 displays words "do you want to transmit?" and a "yes" button and a "no" button.

When the user confirms the search result displayed in the confirmation field 103 and determines that there is no problem in transmitting the search result to the server device 60 and selects the "yes" button in the confirmation dialog 104, the user device 10 determines the displayed search result as transmittable and transmits the search result to the server device 60.

When the user determines that the search result cannot be transmitted to the server device 60 and selects the "no" button of the confirmation dialog 104, the user device 10 determines that the displayed search result as non-transmittable and does not transmit the search result to the server device 60.

When there are a plurality of search results, the search results may be displayed in the confirmation field 103 one by one and determined as transmittable or not in the confirmation dialog 104. As illustrated in (b-1) of FIG. 5, all the plurality of search results may be displayed in the confirmation field 103 and check boxes 107 may be assigned, and the "yes" button in the confirmation dialog 104 may be selected when the search results that are determined to be no problem to be transmitted to the server device 60 are checked.

When there is no transmittable search result, "no" of the confirmation dialog 104 may be selected without confirming any search result.

Alternatively, the administrator may determine whether a search result can be transmitted to the server device 60 instead of the user of the user device 10.

(b-2) of FIG. 5 illustrates the display screen 100 displaying a transmission confirmation screen to the administrator.

The display in (b-2) of FIG. 5 is the same as that of (b-1) of FIG. 5, but no check box 107 is displayed in the confirmation field 103, and words "do you want to confirm by the administrator?", a "yes" button, and a "no" button are displayed in the confirmation dialog 104.

When the user selects the "yes" button, the displayed search results are transmitted to the administrator device 40, and a confirmation screen similar to that illustrated in (b-1) of FIG. 5 is displayed on the display device of the administrator device 40. The administrator determines whether transmission is possible using the confirmation screen. A confirmation result is transmitted to the user device 10, and the user device 10 determines whether transmission is possible based on the confirmation result. The user device 10 transmits the search result determined as transmittable by the administrator device 40 to the server device 60.

(c-1) of FIG. 5 illustrates the display screen 100 displaying an answer sentence.

In (c-1) of FIG. 5, the user device 10 illustrates the display screen 100 displaying an answer field 105 to the administrator. When a search result is transmitted to the server device 60 as a confirmation result of transmission approval using the confirmation dialog, an answer sentence is generated in the server device 60. In this case, the user device 10 displays the answer sentence received from the server device 60 in the answer field 105. At this time, the server device 60 can display a list of search results used to generate the answer sentence, that is, search results that the user device 10 transmitted to the server device 60. The list describes a path of a document used for the answer in the document DB 31 and a chunk particularly used for the answer.

folderA/kansu-manual.pdf [3] means a third chunk in kansu-manual.pdf (document ID 1) in folder A. folderA/program-tebiki.pdf [2] means a second chunk in program-tebiki.pdf (document ID 2) in folder A. folderB/function-method.pdf [1] means a first chunk in function-method.pdf (document ID 3) in folder B.

(c-2) of FIG. 5 illustrates the display screen 100 displaying no answer sentence. When there is no transmittable search result as a result of confirmation of transmission approval using the confirmation dialog, no answer sentence can be generated in the server device 60. Accordingly, the user device 10 cannot display any answer sentence in the answer field 105, and displays "no answer can be displayed" or the like.

Figure 6:
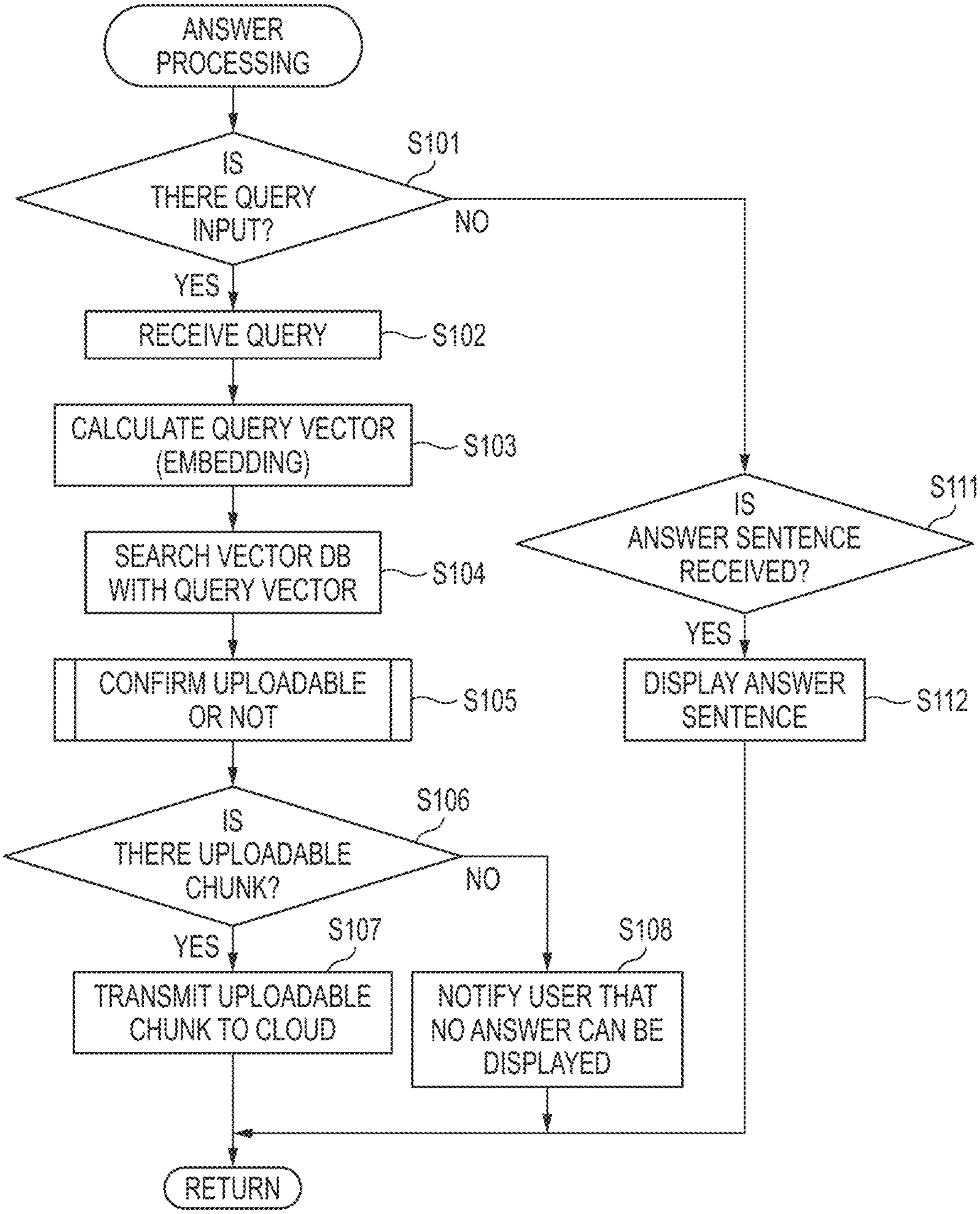
FIG. 6 is a flowchart illustrating answer processing executed by a user device.

FIG. 6 is a flowchart illustrating answer processing executed by a user device.

In step S101, the user device 10 (reception portion 21) determines whether there is a query (question sentence) input by the user using a keyboard, a touch panel, or the like. When determining that there is an input query (yes in step S101), the user device 10 (reception portion 21) receives the query in step S102.

In step S103, the user device 10 (conversion portion 22) calculates embedding of the received query and converts the query into a feature vector indicating a meaning of the query.

In step S104, the user device 10 (search portion 23) compares the feature vector of the calculated query with feature vectors of chunks stored in the vector DB 32, and searches for a chunk having high relevance to the query. Then, the user device 10 (search portion 23) acquires a corresponding chunk in the document DB 31 as a search result based on an ID assigned to the searched feature vector.

In step S105, the user device 10 (confirmation portion 24) confirms whether the chunk that is the search result acquired by the search portion 23 can be transmitted to a cloud (server device 60).

In step S106, the user device 10 (transmission portion 25) confirms whether there is a transmittable chunk as a confirmation result.

When there is a transmittable chunk (yes in step S106), the user device 10 (transmission portion 25) transmits the transmittable chunk to the cloud (server device 60) in step S107, and ends the current answer processing.

When there is no transmittable chunk (no in step S106), the user device 10 (display portion 27) displays on the display device 12 that no answer can be displayed in step S108, and ends the answer processing.

When determining that there is no input query (no in step S101), the user device 10 (receiving portion 26) determines whether an answer sentence is received from the server device 60 in step S111.

When determining that there is no received answer sentence (no in step S111), the current answer processing is ended.

When determining that there is a received answer sentence (yes in step S111), the user device 10 (display portion 27) displays the answer sentence on the display device 12 in step S112, and ends the current answer processing. Alternatively, the user device 10 may read the answer sentence by audio instead of displaying the answer sentence on the display device 12.

Figure 7A:
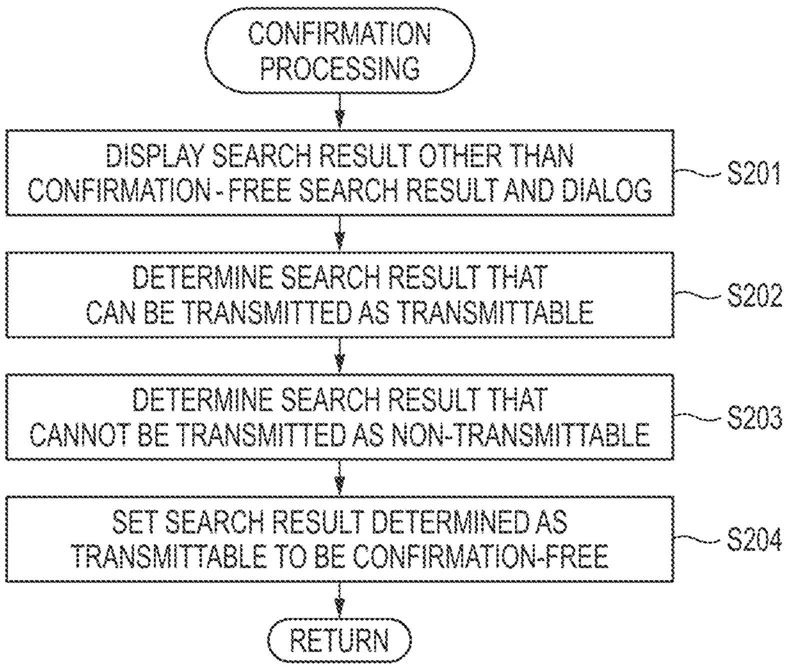
FIGS. 7A to 7C illustrate confirmation processing executed by a user device (part 1).
Figure 7B:
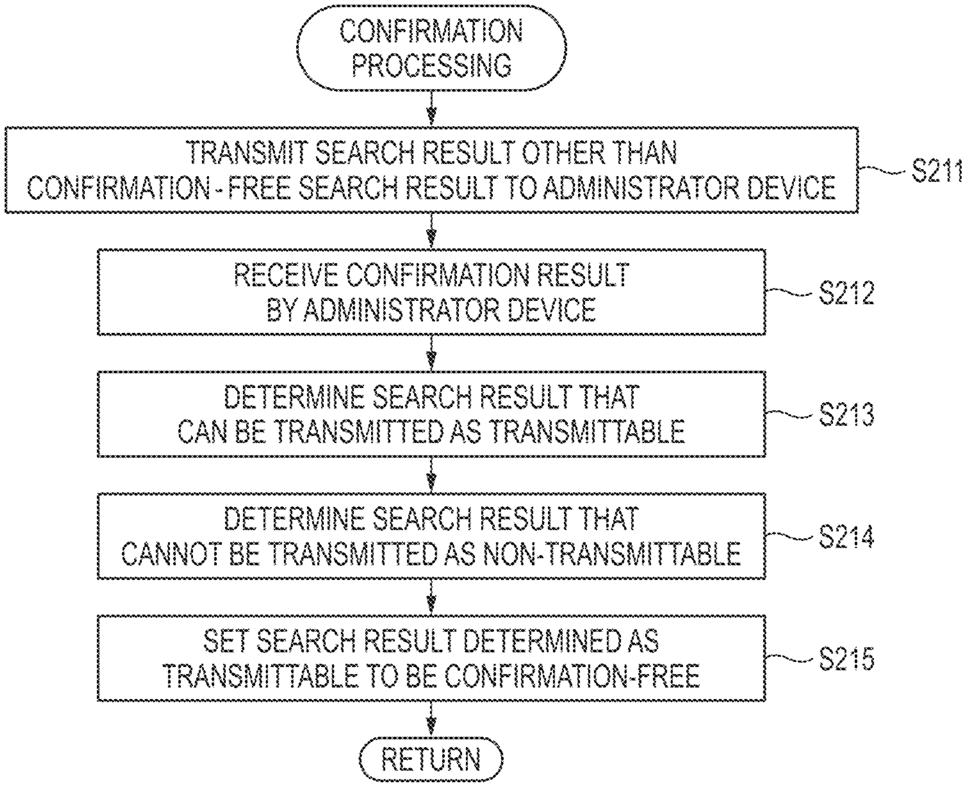
Figure 7C:
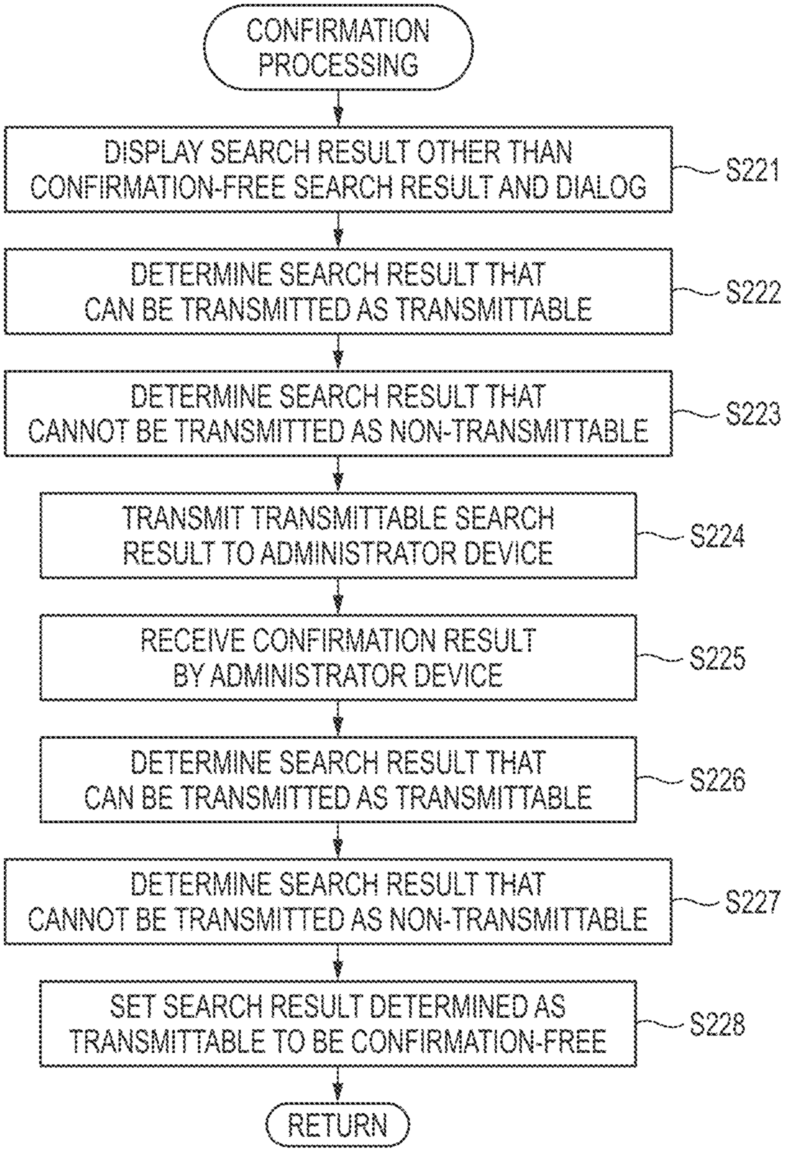

FIGS. 7A to 7C illustrate confirmation processing executed by a user device (part 1).

FIG. 7A is a flowchart illustrating a first example of the confirmation processing.

In step S201, the confirmation portion 24 displays, on the display device 12, a content of a search result other than that stored in the confirmation-free information DB 33 and a confirmation dialog.

In step S202, the confirmation portion 24 determines a search result operated to be transmitted in the confirmation dialogue as transmittable.

In step S203, the confirmation portion 24 determines a search result operated not to be transmitted in the confirmation dialogue as non-transmittable.

In step S204, the confirmation portion 24 stores the search result determined as transmittable in the confirmation-free information DB 33 and ends the confirmation processing.

FIG. 7B is a flowchart illustrating a second example of the confirmation processing.

In step S211, the confirmation portion 24 transmits a search result other than that stored in the confirmation-free information DB 33 to the administrator device 40.

In step S212, the confirmation portion 24 receives a confirmation result of the administrator device 40.

In step S213, the confirmation portion 24 determines a search result operated to be transmitted by the administrator device 40 as transmittable.

In step S214, the confirmation portion 24 determines a search result operated not to be transmitted by the administrator device 40 as non-transmittable.

In step S215, the confirmation portion 24 stores the search result determined as transmittable in the confirmation-free information DB 33 and ends the confirmation processing.

FIG. 7C is a flowchart illustrating a third example of the confirmation processing.

In step S221, the confirmation portion 24 displays, on the display device 12, a content of a search result other than that stored in the confirmation-free information DB 33 and a confirmation dialog.

In step S222, the confirmation portion 24 determines a search result operated to be transmitted in the confirmation dialogue as transmittable.

In step S223, the confirmation portion 24 determines a search result operated not to be transmitted in the confirmation dialogue as non-transmittable.

In step S224, the confirmation portion 24 transmits the search result determined as transmittable to the administrator device 40.

In step S225, the confirmation portion 24 receives a confirmation result of the administrator device 40.

In step S226, the confirmation portion 24 determines a search result operated to be transmitted by the administrator device 40 as transmittable.

In step S227, the confirmation portion 24 determines a search result operated not to be transmitted by the administrator device 40 as non-transmittable.

In step S228, the confirmation portion 24 stores the search result determined as transmittable in the confirmation-free information DB 33 and ends the confirmation processing.

When a search result (chunk) itself is not stored in the confirmation-free information DB 33 but included in a document or a folder stored in the confirmation-free information DB 33, transmission approval may not be confirmed.

It should be noted that a content previously determined as transmittable may be determined as non-transmittable this time due to a change in security policies in a company or the like. Accordingly, a search result once determined as transmittable may not be excluded from confirmation but be confirmed for transmission approval each time. In this case, the processing of registering the search result determined as transmittable in step S204, step S215, and step S228 in the confirmation-free information DB 33 may not be performed.

Figure 8A:
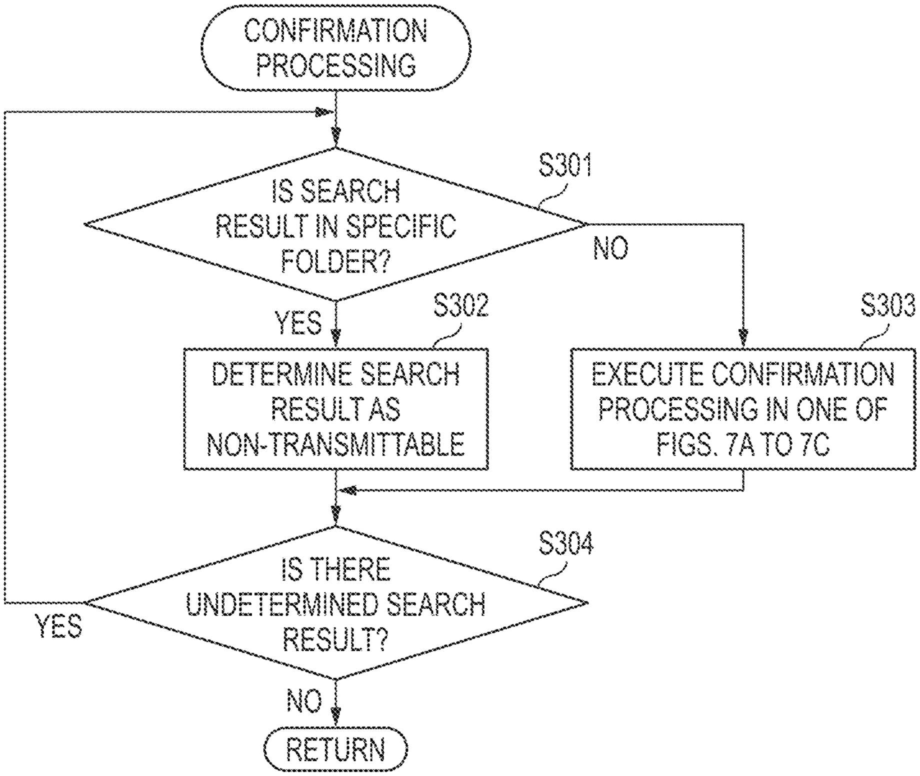
FIGS. 8A and 8B illustrate confirmation processing executed by a user device (part 2).
Figure 8B:
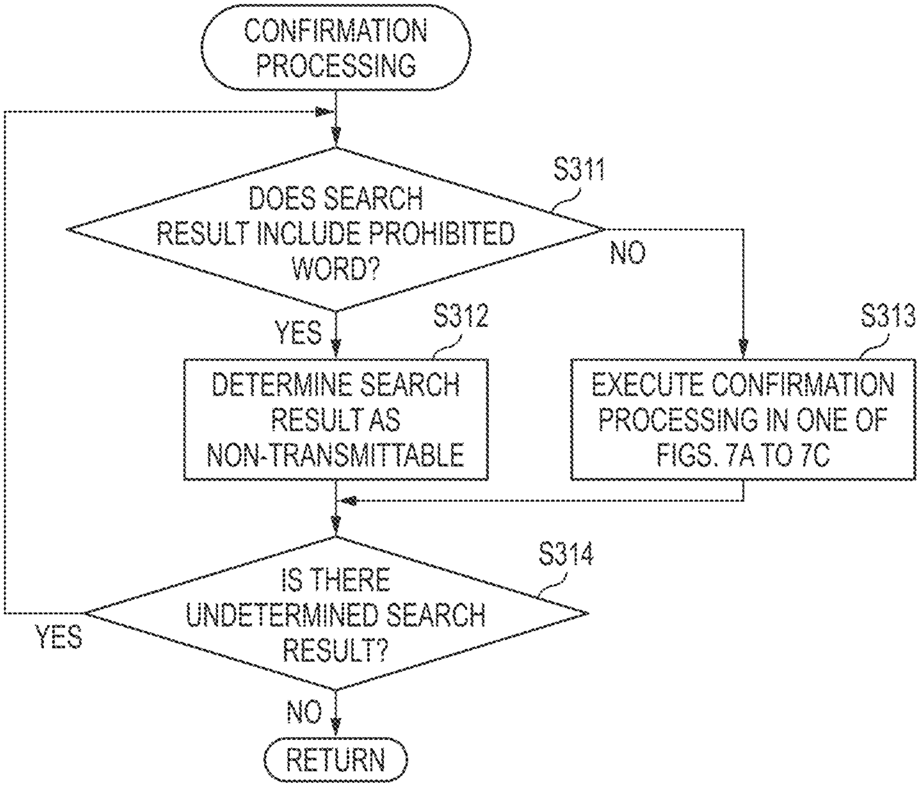

FIGS. 8A and 8B illustrate confirmation processing executed by a user device (part 2).

FIG. 8A is a flowchart illustrating a fourth example of the confirmation processing.

In step S301, the confirmation portion 24 determines whether a search result is a chunk included in a document in a specific folder in the document DB 31. When determining that the search result is a chunk included in a document in a specific folder of the document DB 31 (yes in step S301), the confirmation portion 24 determines the search result as non-transmittable in step S302.

When determining that the search result is not a chunk included in a document in a specific folder of the document DB 31 (no in step S301), the confirmation portion 24 executes the confirmation processing described with reference to any one of FIGS. 7A to 7C in step S303. Further, the processing of step S303 may not be performed, and a search result that is not in a specific folder may be freely determined as transmittable.

In step S304, the confirmation portion 24 determines whether there is an undetermined search result. When determining that there is no undetermined search result (no in step S304), the confirmation processing is ended. When determining that there is an undetermined search result (yes in step S304), the process returns to step S301 and the confirmation processing is executed on another search result.

FIG. 8B is a flowchart illustrating a fifth example of the confirmation processing.

In step S311, the confirmation portion 24 determines whether a search result includes a prohibited word. The prohibited word includes "company internal", "confidential", and the like described above.

When determining that the search result includes a prohibited word (yes in step S311), the confirmation portion 24 determines the search result as non-transmittable in step S312.

When determining that the search result includes no prohibited word (no in step S311), the confirmation portion 24 performs the confirmation processing described with reference to any one of FIGS. 7A to 7C in step S313. Further, the processing of step S313 may not be performed, and a search result that includes no prohibited word may be freely determined as transmittable.

In step S314, the confirmation portion 24 determines whether there is a search result for which transmission approval is not determined. When determining that there is no undetermined search result (no in step S314), the confirmation processing is ended. When determining that there is an undetermined search result (yes in step S314), the processing returns to step S311 and the confirmation processing is executed on another search result.

Figure 9:
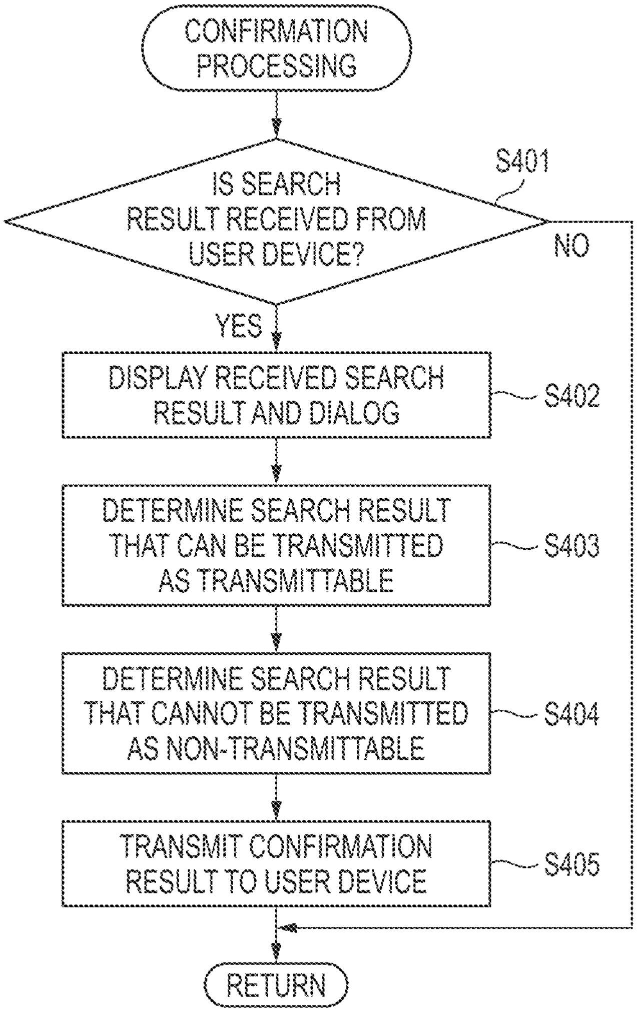
FIG. 9 is a flowchart illustrating confirmation processing executed by an administrator device.

FIG. 9 is a flowchart illustrating confirmation processing executed by an administrator device.

In step S401, the administrator device 40 (receiving portion 52) determines whether a search result is received from the user device 10.

When determining that there is no received search result (no in step S401), the administrator device 40 ends the processing.

When determining that there is a received search result (yes in step S401), the administrator device 40 (confirmation portion 53) displays a content of the search result and a confirmation dialog on the display device 42 in step S402.

In step S403, the confirmation portion 53 determines a search result operated to be transmitted in the confirmation dialogue as transmittable.

In step S404, the confirmation portion 53 determines a search result operated not to be transmitted in the confirmation dialogue as non-transmittable.

In step S405, the transmission portion 54 transmits a confirmation result to the user device 10 and ends the processing.

Other Embodiments

In the answer system 1 according to the present embodiment described above, in order to determine a document to be transmitted to the LLM, embedding is executed to documents in the document DB 31 to form feature vectors. Then, the user device 10 that makes a question executes embedding for an input query to form a feature vector and compares the feature vectors of the documents with the feature vector of the query, thereby searching for a document having high relevance to the query.

Alternatively, the user device 10 may search for a document in the document DB without vectorizing the query, and determine a document having high relevance. For example, the search may be performed using a key word included in the query, and a chunk having a large number of hits may be determined to have high relevance. A method for calculating similarity using an appearance frequency of a word of a query or a document in this manner is known in a name of term frequency-inverse document frequency (TF-IDF) or the like.

Even in such a case, the user device 10 determines a chunk to be used for an answer from the document DB 31 private to the server device 60, and transmits the chunk to the server device 60 through the confirmation processing of FIGS. 7A to 8B. Accordingly, an answer system using the LLM while preventing a risk of leakage of confidential data can be implemented.

Figure 10:
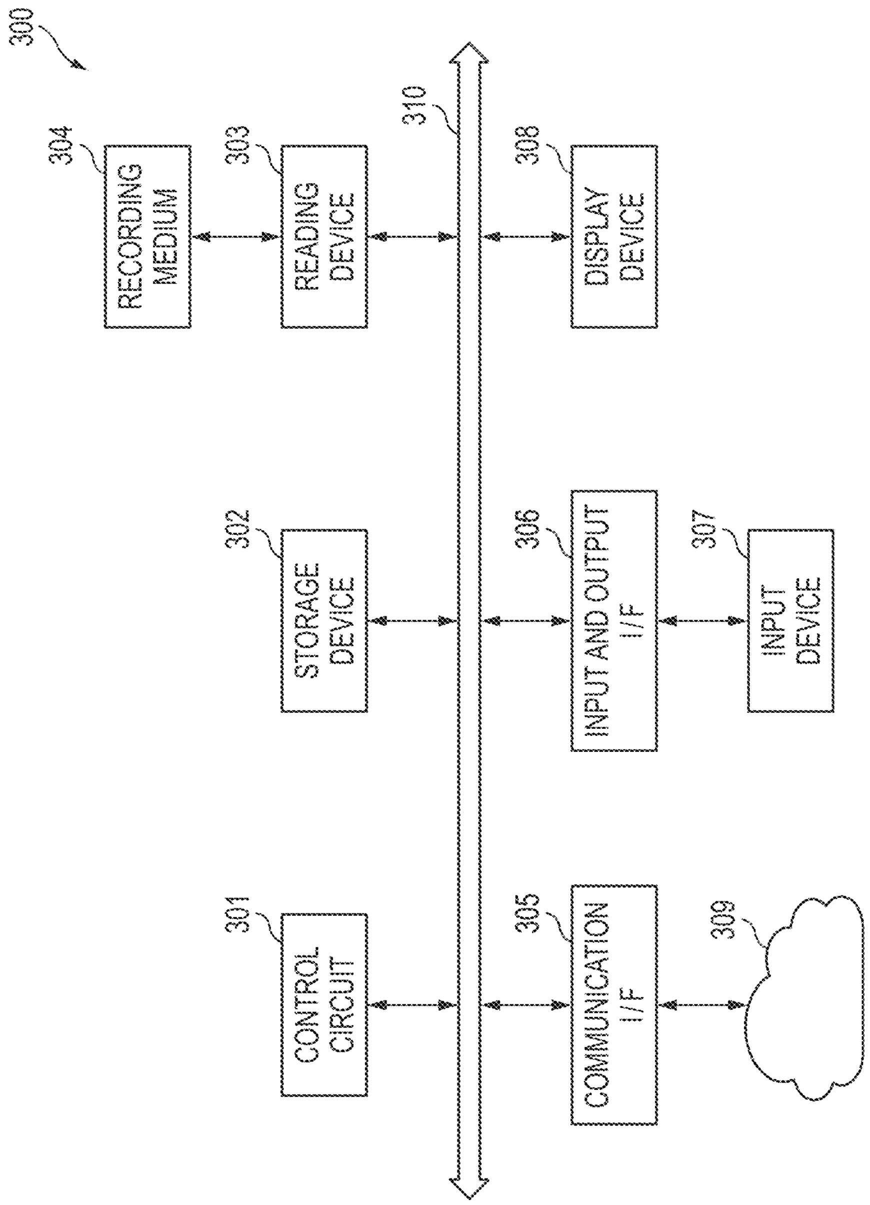
FIG. 10 is a block diagram illustrating an example of a computer device.

FIG. 10 is a block diagram illustrating an example of a computer device.

Configurations of a computer device 300 will be described with reference to FIG. 10.

In FIG. 10, the computer device 300 includes a control circuit 301, a storage device 302, a reading device 303, a recording medium 304, a communication interface 305, an input and output interface 306, an input device 307, and a display device 308. The communication interface 305 is connected to a network 309. These components are connected by a bus 310.

The user device 10 and the administrator device 40 may be configured by appropriately selecting a part or all of the components described in the computer device 300.

The control circuit 301 controls the entire computer device 300. The control circuit 301 is a processor such as a central processing unit (CPU), a multi-core CPU, a field programmable gate array (FPGA), and a programmable logic device (PLD).

The control circuit 301 functions as, for example, the reception portion 21, the conversion portion 22, the search portion 23, the confirmation portion 24, the transmission portion 25, the receiving portion 26, and the display portion 27 in FIG. 2.

The control circuit 301 functions as, for example, the reception portion 51, the receiving portion 52, the confirmation portion 53, the transmission portion 54, and the display portion 55 in FIG. 3.

The storage device 302 stores various data. The storage device 302 is a non-transitory recording medium such as a memory such as a read only memory (ROM) or a random access memory (RAM), a hard disk (HD), or a solid state drive (SSD). For example, the storage device 302 functions as the storage portion 30 in FIG. 2.

The ROM stores programs such as a boot program. The RAM is used as a work area of the control circuit 301. The HD stores programs such as an OS, an application program, and firmware, and various data.

When performing various processing, the user device 10 reads out a performance control program stored in the storage device 302 into the RAM. By executing a control program read into the RAM by the control circuit 301, the user device 10 executes processing including one or more of reception processing, conversion processing, search processing, confirmation processing, transmission processing, receiving processing, and display processing.

When performing various processing, the administrator device 40 reads out a performance control program stored in the storage device 302 into the RAM. By executing a control program read into the RAM by the control circuit 301, the user device 10 executes processing including one or more of reception processing, receiving processing, confirmation processing, transmission processing, and display processing.

Each of the above-described programs may be stored in a storage device included in a server on the network 309 as long as it is accessible by the control circuit 301 via the communication interface 305.

The reading device 303 is controlled by the control circuit 301 to read data from and write data to the removable recording medium 304. The reading device 303 is, for example, a floppy disk drive (FDD), a compact disc drive (CDD), a digital versatile disk drive (DVDD), a Blu-ray (registered trademark) disk drive (BDD), a universal serial bus (USB), or SATA.

The recording medium 304 stores various data. The recording medium 304 may store, for example, processing programs of an information processing device.

The control program of the user device 10 includes one or more of reception processing, conversion processing, search processing, confirmation processing, transmission processing, receiving processing, and display processing. The control program of the administrator device 40 includes one or more of reception processing, receiving processing, confirmation processing, transmission processing, and display processing.

The recording medium 304 is connected to the bus 310 via the reading device 303, and the control circuit 301 controls the reading device 303 to read/write data.

The recording medium 304 is a non-transitory recording medium such as a SD memory card, a floppy disk (FD), a compact disc (CD), a digital versatile disk (DVD), a Blu-ray (registered trademark) disk (BD), and a flash memory.

The communication interface 305 communicably connects the computer device 300 and other devices via the network 309. The communication interface 305 may include an interface having a wireless LAN function and an interface having a near distance wireless communication function. The wireless LAN interface may support Wi-Fi (registered trademark) based on, for example, a wireless LAN standard. The near distance wireless interface may support Bluetooth (registered trademark) based on, for example, a near distance wireless communication standard. The LAN is an abbreviation for local area network. The communication interface 305 functions as, for example, the communication device 13 in FIG. 2, and functions as the communication device 43 in FIG. 3.

The input and output interface 306 is connected to the input device 307, for example, and, when signals indicating various types of information are input from the connected input device 307, outputs the input signals via the bus 310 to the control circuit 301. When the signals indicating various types of information output from the control circuit 301 are input via the bus 310, the input and output interface 306 outputs the signals to connected devices.

The input device 307 is, for example, a keyboard, a mouse, or a touch panel. The input device 307 functions as, for example, the input device 11 in FIG. 2, and functions as the input device 41 in FIG. 3.

The display device 308 displays various types of information. The display device 308 displays, for example, an image drawn by the user device 10. The display device 308 may display information for receiving an input on the touch panel. The display device 308 functions as, for example, the display device 12 in FIG. 2, and functions as the display device 42 in FIG. 3.

The input and output interface 306, the input device 307, and the display device 308 may function as a graphical user interface (GUI). Accordingly, the computer device 300 receives an intuitive operation by a touch panel, a mouse, or the like.

The network 309 is, for example, a LAN, wireless communication, or the Internet, and performs communication connection between the computer device 300 and other devices.

According to the aspect of the present invention, security concerns in an answer system can be eliminated.

The present embodiment is not limited to the embodiment described above, and various configurations or embodiments can be adopted without departing from the gist of the present embodiment.

What is claimed is:

1. An information processing device for obtaining an answer to a query by processing a document and the query using a machine learning model provided by a server device, the information processing device comprising:

a reception portion configured to receive the query input by a user using an input device;

a search portion configured to search for one or more documents stored in a document database private to the server device based on the received query and configured to acquire one or more contents having high relevance to the query as a search result;

a transmission portion configured to transmit the search result to the server device via a communication device;

a receiving portion configured to receive, from the server device via the communication device, an answer sentence generated by the server device using the transmitted search result; and a confirmation portion configured to confirm whether the search result can be transmitted to the server device, wherein the confirmation portion is configured to confirm the search result as non-transmittable when the search result includes a specific character string indicating confidential information, and the transmission portion is configured to transmit the search result confirmed as transmittable by the confirmation portion to the server device.

2. The information processing device according to claim 1, further comprising a conversion portion configured to convert the received query into a feature vector, wherein the document stored in the document database is converted into one or more feature vectors and stored in a vector database, and the search portion is configured to compare the feature vector stored in the vector database with the feature vector of the query to search for a feature vector having high relevance to the query, and configured to acquire a content of a document corresponding to the feature vector from the document database as the search result to be transmitted to the server device.

3. The information processing device according to claim 1, wherein the search portion is configured to acquire only a content having highest relevance to the query as the search result to be transmitted to the server device.

4. The information processing device according to claim 1, wherein the confirmation portion is configured to display a content of the search result and a confirmation screen on a display device, and configured to confirm the search result as transmittable when the search result is operated to be transmittable.

5. The information processing device according to claim 1, wherein the confirmation portion is configured to transmit a content of the search result to another device, and configured to confirm the search result as transmittable when receiving information confirming that the search result is transmittable from the other device.

6. The information processing device according to claim 1, wherein the confirmation portion is configured to display a content of the search result and a confirmation screen on a display device, configured to transmit the search result to another device when the search result is operated to be transmittable, and configured to confirm the search result as transmittable when receiving information confirming that the search result is transmittable from the other device.

7. The information processing device according to claim 1, wherein the confirmation portion is configured to confirm a content that was once transmittable, as transmittable without confirming again.

8. The information processing device according to claim 1, wherein the confirmation portion is configured to confirm a content included in the same document as a content that was once transmittable, as transmittable without confirming.

9. The information processing device according to claim 1, wherein the confirmation portion is configured to confirm a content included in a document in the same folder as a document including a content that was once transmittable, as transmittable without confirming.

10. The information processing device according to claim 1, wherein the confirmation portion is configured to confirm a content included in a document in a specific folder in the document database, as transmittable without confirming.

11. An information processing method for obtaining an answer to a query with a processor by processing a document and the query using a machine learning model provided by a server device, wherein the processor is configured to receive the query input by a user using an input device, search for one or more documents stored in a document database private to the server device based on the received query and acquire one or more contents having high relevance to the query as a search result, confirm whether the search result can be transmitted to the server device, wherein the search result is confirmed as non-transmittable when the search result includes a specific character string indicating confidential information, transmit the search result confirmed as transmittable to the server device via a communication device, and receive, from the server device via the communication device, an answer sentence generated by the server device using the transmitted search result.

12. A non-transitory computer-readable storage medium storing an information processing program configured to cause a processor to execute an information processing method for obtaining an answer to a query by processing a document and the query using a machine learning model provided by a server device, wherein the processor is configured to receive the query input by a user using an input device, search for one or more documents stored in a document database private to the server device based on the received query and acquire one or more contents having high relevance to the query as a search result, confirm whether the search result can be transmitted to the server device, wherein the search result is confirmed as non-transmittable when the search result includes a specific character string indicating confidential information, transmit the search result confirmed as transmittable to the server device via a communication device, and receive, from the server device via the communication device, an answer sentence generated by the server device using the transmitted search result.

* * * * *